(12) United States Patent
Liu et al.

(10) Patent No.: US 11,388,029 B2
(45) Date of Patent: Jul. 12, 2022

(54) TRAINING PACKET SENDING METHOD AND APPARATUS

(71) Applicant: Huawei Technologies Co., Ltd., Shenzhen (CN)

(72) Inventors: Jinnan Liu, Beijing (CN); Dejian Li, Beijing (CN); Jiamin Chen, Beijing (CN); Yongping Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/897,021

(22) Filed: Jun. 9, 2020

(65) Prior Publication Data
US 2020/0304347 A1    Sep. 24, 2020

Related U.S. Application Data

(63) Continuation of application No. 16/182,064, filed on Nov. 6, 2018, now Pat. No. 10,728,057, which is a
(Continued)

(51) Int. Cl.
*H04L 25/03* (2006.01)
*H04L 25/02* (2006.01)
(Continued)

(52) U.S. Cl.
CPC ..... *H04L 25/03006* (2013.01); *H04B 7/0617* (2013.01); *H04L 5/0051* (2013.01);
(Continued)

(58) Field of Classification Search
CPC ............. H04L 25/03006; H04L 5/0051; H04L 5/0094; H04L 25/0224; H04L 27/2692;
(Continued)

(56) References Cited

U.S. PATENT DOCUMENTS

2010/0271991 A1    10/2010    Kimura et al.
2015/0043409 A1    2/2015    Choi et al.
(Continued)

FOREIGN PATENT DOCUMENTS

CN    101031130 A    9/2007
CN    101873195 A    10/2010
(Continued)

OTHER PUBLICATIONS

"Part 11: Wireless LAN Medium Access Control (MAC) and Physical Layer (PHY) Specifications Amendment 3: Enhancements for Very High Throughput in the 60 GHz Band," IEEE Std 802.11ad, Dec. 28, 2012, 628 pages.

*Primary Examiner* — Hashim S Bhatti
(74) *Attorney, Agent, or Firm* — Conley Rose, P.C.

(57) ABSTRACT

A training packet sending method and apparatus, where the method includes generating, by a first device, a training packet, where the training packet includes a preamble, a header, and a training field, and the header includes at least a legacy header, and repeatedly sending, by the first device, the preamble using N channels, sending the legacy header in the header using the N channels, and sending the training field to at least one second device using H channels of the N channels, where N is greater than 1, and H is greater than 1 and less than or equal to N.

20 Claims, 6 Drawing Sheets

Related U.S. Application Data continuation of application No. PCT/CN2016/081333, filed on May 6, 2016.

(51) Int. Cl.
| | |
|---|---|
| *H04B 7/06* | (2006.01) |
| *H04L 5/00* | (2006.01) |
| *H04W 8/08* | (2009.01) |
| *H04L 27/26* | (2006.01) |
| *H04W 24/10* | (2009.01) |
| *H04W 84/12* | (2009.01) |
| *H04W 16/28* | (2009.01) |

(52) U.S. Cl.
CPC ........ *H04L 5/0094* (2013.01); *H04L 25/0224* (2013.01); *H04L 27/2613* (2013.01); *H04L 27/2692* (2013.01); *H04W 8/08* (2013.01); *H04W 24/10* (2013.01); *H04L 2025/0377* (2013.01); *H04L 2025/03815* (2013.01); *H04W 16/28* (2013.01); *H04W 84/12* (2013.01)

(58) Field of Classification Search
CPC ....... H04L 27/2613; H04L 2025/03815; H04L 2025/0377; H04W 8/08; H04W 24/10; H04W 16/28; H04W 84/12; H04B 7/0617

See application file for complete search history.

(56) References Cited

U.S. PATENT DOCUMENTS

| | | | |
|---|---|---|---|
| 2016/0149631 A1 | 5/2016 | Sanderovich | |
| 2016/0164800 A1 | 6/2016 | Eitan et al. | |
| 2016/0190686 A1* | 6/2016 | Gao | H04B 7/0617 |
| | | | 342/374 |
| 2016/0323878 A1* | 11/2016 | Ghosh | H04W 72/0453 |
| 2016/0374114 A1 | 12/2016 | Lu et al. | |
| 2018/0048509 A1* | 2/2018 | Huang | H04L 5/0094 |
| 2018/0367650 A1* | 12/2018 | Motozuka | H04L 25/0216 |

FOREIGN PATENT DOCUMENTS

| | | |
|---|---|---|
| CN | 103718591 A | 4/2014 |
| CN | 104584473 A | 4/2015 |

* cited by examiner

TRAINING PACKET SENDING METHOD AND APPARATUS

CROSS-REFERENCE TO RELATED APPLICATIONS

This application is a continuation of U.S. patent application Ser. No. 16/182,064, filed on Nov. 6, 2018, which is a continuation of International Patent Application No. PCT/CN2016/081333 filed on May 6, 2016. All of the aforementioned patent applications are hereby incorporated by reference in their entireties.

TECHNICAL FIELD

This application relates to the field of wireless communications technologies, and in particular, to a training packet sending method and apparatus.

BACKGROUND

In high-frequency communication, especially on a millimeter-wave band, an attenuation degree of a transmit signal is far greater than that at a lower frequency (6 gigahertz (GHz)). To reduce attenuation of a high-frequency signal, the signal is usually sent using beams. When beam bandwidth is sufficiently narrow, a transmit end and a receive end can reach a specific communication distance and transmission rate. However, when the beam is excessively narrow, it is very difficult for the transmit end and the receive end to discover each other, and when the beam is excessively wide, an antenna gain is not high, and an ideal transmission rate cannot be obtained. Therefore, in the Institute of Electrical and Electronics Engineers (IEEE) 802.11ad standard, Sector Level Sweep (SLS) is designed to implement device discovery and sector level beam sweep, and a beam refinement protocol (BRP) is designed to optimize a receive beam and a transmit beam. According to stipulations in the BRP, both a receiving party and a sending party can implement beam training and beam tracking by sending a BRP packet. IEEE 802.11ad supports only transmission on a single antenna (single radio frequency channel) on a single 2.16 GHz channel. To improve a throughput of a wireless local area network (WLAN), support of a channel bonding (CB) technology and a Multiple-Input Multiple-Output (MIMO) technology in an IEEE 802.11ad based framework is currently under discussion in IEEE 802.11ay. However, in a current BRP, a BRP packet is designed for a case in which a single 2.16 GHz channel is supported. Therefore, there is no definite solution to how the transmit end sends the BRP packet on a plurality of channels.

SUMMARY

Embodiments of this application provide a training packet sending method and apparatus to implement beam training in a WLAN that uses a multi-channel transmission technology.

An embodiment of this application provides a training packet sending method, including generating, by a first device, a training packet, where the training packet includes a preamble, a header, and a training field, and the header includes at least a legacy header, and repeatedly sending, by the first device, the preamble using N channels, sending the legacy header in the header using the N channels, and sending the training field to at least one second device using H channels of the N channels, where N is greater than 1, and H is greater than 1 and less than or equal to N.

According to the method provided in this embodiment of this application, after performing CB on the N channels, the first device may repeatedly send the preamble in the training packet using the N channels, send the legacy header in the header in the training packet using the N channels, and send the training field using the H channels of the N channels, to complete sending of the training packet using a CB technology. In addition, because the training field may be sent on the H channels of the N channels, complexity of measuring a device using the training field can be reduced. Configurations for sending the training field may be different on the channels. For example, training field lengths may be different, or antennas used for sending the training field may be different. Therefore, flexibility of sending the training field can be improved.

Optionally, the data field is located after the header and before the training field, and the first device sends the data field using J channels of the N channels and M wideband channels, where an $i^{th}$ wideband channel of the M wideband channels includes $K_i$ adjacent channels in the N channels and guard bandwidth between the $K_i$ adjacent channels, M is greater than or equal to 0, $$P = \sum_{i=1}^{M} K_i,$$

J+P=N, and J is greater than or equal to 0.

Optionally, the legacy header includes a training length field used to indicate a length of a training field that is sent on a same channel as the legacy header.

According to the method provided in this embodiment of this application, the training length field is used to indicate the length of the training field that is sent on the same channel as the legacy header such that the second device that receives the training field can rapidly determine information such as the length of the training field, to rapidly measure a channel based on the training field.

Optionally, the header includes training field channel indication information, and the training field channel indication information is used to indicate a channel occupied by the training field.

According to the method provided in this embodiment of this application, the training field channel indication information is used to indicate the channel occupied by the training field such that the second device can rapidly determine the training field and receive the training field, thereby improving efficiency.

Optionally, the header further includes data field channel indication information, and the data field channel indication information is used to indicate a channel occupied by the data field.

According to the method provided in this embodiment of this application, the data field channel indication information is used to indicate the channel occupied by the data field such that the second device can rapidly determine the data field and receive the data field, thereby improving efficiency.

Optionally, the header further includes a new header, and both the data field channel indication information and the training field channel indication information are located in the new header in the header, both the data field channel indication information and the training field channel indication information are located in the legacy header in the header, or the data field channel indication information is located in the new header in the header, and the training field channel indication information is located in the legacy header in the header.

Optionally, the training field channel indication information is a bitmap, and one bit in the bitmap uniquely corresponds to one of the N channels, and the bit indicates that the training field occupies a channel of the N channels that corresponds to the bit when a value of a bit in the bitmap is a preset value.

According to the foregoing method, the channel of the N channels that is occupied by the training field can be concisely and intuitively indicated using the bitmap.

Optionally, the sending, by the first device, the training field to at least one second device using H channels of the N channels includes sending, by the first device, the training field to the at least one second device using preset H channels in the N channels.

Optionally, the training field includes only the following Golay sequences, Ga64, Gb64, Ga128, and Gb128.

An embodiment of this application provides a training packet receiving method, including receiving, by a second device on L channels of N channels, a training field sent by a first device using a training packet, where the training packet includes a preamble, a header including at least a legacy header, and a training field, the preamble is repeatedly sent by the first device using the N channels, the legacy header in the header is sent by the first device using the N channels, and the training field is sent by the first device using H channels of the N channels, where N is greater than 1, H is greater than 1 and less than or equal to N, and L is less than or equal to H, and measuring, by the second device, the L channels based on the received training field, and determining measurement results of the L channels.

According to the method provided in this embodiment of this application, the second device receives the training field on the L channels of the H channels on which the first device sends the training field, and determines the measurement results of the L channels based on the received training field to implement channel measurement.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by a data field.

Optionally, the training field channel indication information is a bitmap, and one bit in the bitmap uniquely corresponds to one of the N channels, and when a value of a bit in the bitmap is a preset value, the bit indicates that the training field occupies a channel of the N channels that corresponds to the bit.

Optionally, after the determining measurement results of the L channels, the method further includes feeding back, by the second device, the measurement results to the first device, where the measurement results include L channel measurement results and L channel identifiers, and one channel identifier uniquely corresponds to one channel measurement result and is used to indicate a channel to which the channel measurement result corresponding to the channel identifier belongs, where each channel measurement result includes at least one of the following a signal-to-interference-plus-noise ratio, a received signal strength indicator (RSSI), an optimal sector identifier, and channel measurement information, or the measurement results include a weighted signal-to-interference-plus-noise ratio and a maximum-probability optimal sector identifier, where the weighted signal-to-interference-plus-noise ratio is determined based on L signal-to-interference-plus-noise ratios of the L channels, and the maximum-probability optimal sector identifier is determined based on L optimal sector identifiers of the L channels.

An embodiment of this application provides a training packet sending apparatus, including a processing unit configured to generate a training packet, where the training packet includes a preamble, a header, and a training field, and the header includes at least a legacy header, and a transceiver unit configured to repeatedly send the preamble using N channels, send the legacy header in the header using the N channels, and send the training field to at least one second device using H channels of the N channels, where N is greater than 1, and H is greater than 1 and less than or equal to N.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by a data field.

Optionally, the training field channel indication information is a bitmap, and one bit in the bitmap uniquely corresponds to one of the N channels, and the bit indicates that the training field occupies a channel of the N channels that corresponds to the bit when a value of a bit in the bitmap is a preset value.

Optionally, the processing unit is further configured to send the training field to the at least one second device using preset H channels in the N channels.

Optionally, the training field includes only the following Golay sequences, Ga64, Gb64, Ga128, and Gb128.

An embodiment of this application provides a training packet receiving apparatus, including a transceiver unit configured to receive, on L channels of N channels, a training field sent by a first device using a training packet, where the training packet includes a preamble, a header including at least a legacy header, and a training field, the preamble is repeatedly sent by the first device using the N channels, the legacy header in the header is sent by the first device using the N channels, and the training field is sent by the first device using H channels of the N channels, where N is greater than 1, H is greater than 1 and less than or equal to N, and L is less than or equal to H, and a processing unit configured to measure the L channels based on the received training field, and determine measurement results of the L channels.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by a data field.

Optionally, the training field channel indication information is a bitmap, and one bit in the bitmap uniquely corresponds to one of the N channels, and the bit indicates that the training field occupies a channel of the N channels that corresponds to the bit when a value of a bit in the bitmap is a preset value.

Optionally, after determining the measurement results of the L channels, the transceiver unit is further configured to feedback the measurement results to the first device, where the measurement results include L channel measurement results and L channel identifiers, and one channel identifier uniquely corresponds to one channel measurement result and is used to indicate a channel to which the channel measurement result corresponding to the channel identifier belongs, where each channel measurement result includes at least one of the following a signal-to-interference-plus-noise ratio, an RSSI, an optimal sector identifier, and channel measurement information, or the measurement results include a weighted signal-to-interference-plus-noise ratio and a maximum-probability optimal sector identifier, where the weighted signal-to-interference-plus-noise ratio is determined based on L signal-to-interference-plus-noise ratios of the L channels, and the maximum-probability optimal sector identifier is determined based on L optimal sector identifiers of the L channels.

An embodiment of this application provides a training packet sending apparatus, including a processor configured to generate a training packet, where the training packet includes a preamble, a header, and a training field, and the header includes at least a legacy header, and a transceiver configured to repeatedly send the preamble using N channels, send the legacy header in the header using the N channels, and send the training field to at least one second device using H channels of the N channels, where N is greater than 1, and H is greater than 1 and less than or equal to N.

Optionally, the training packet further includes a data field, and the data field is located after the header and before the training field, and the transceiver is further configured to send the data field using J channels of the N channels and M wideband channels, where an $i^{th}$ wideband channel of the M wideband channels includes $K_i$ adjacent channels in the N channels and guard bandwidth between the $K_i$ adjacent channels, M is greater than or equal to 0, $$P = \sum_{i=1}^{M} K_i,$$

J+P=N, and J is greater than or equal to 0.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by the data field.

Optionally, the training field channel indication information is a bitmap, and one bit in the bitmap uniquely corresponds to one of the N channels, and the bit indicates that the training field occupies a channel of the N channels that corresponds to the bit when a value of a bit in the bitmap is a preset value.

Optionally, the processor is further configured to send the training field to the at least one second device using preset H channels in the N channels.

Optionally, the training field includes only the following Golay sequences, Ga64, Gb64, Ga128, and Gb128.

An embodiment of this application provides a training packet receiving apparatus, including a transceiver configured to receive, on L channels of N channels, a training field sent by a first device using a training packet, where the training packet includes a preamble, a header including at least a legacy header, and a training field, the preamble is repeatedly sent by the first device using the N channels, the legacy header in the header is sent by the first device using the N channels, and the training field is sent by the first device using H channels of the N channels, where N is greater than 1, H is greater than 1 and less than or equal to N, and L is less than or equal to H, and a processor configured to measure the L channels based on the received training field, and determine measurement results of the L channels.

Optionally, the legacy header includes a training length field used to indicate a length of a training field that is sent on a same channel as the legacy header.

Optionally, the header further includes training field channel indication information, and the training field channel indication information is used to indicate a channel occupied by the training field.

Optionally, the header further includes data field channel indication information, and the data field channel indication information is used to indicate a channel occupied by a data field.

Optionally, the training field channel indication information is a bitmap, and one bit in the bitmap uniquely corresponds to one of the N channels, and the bit indicates that the training field occupies a channel of the N channels that corresponds to the bit when a value of a bit in the bitmap is a preset value.

Optionally, after determining the measurement results of the L channels, the transceiver is further configured to feedback the measurement results to the first device, where the measurement results include L channel measurement results and L channel identifiers, and one channel identifier uniquely corresponds to one channel measurement result and is used to indicate a channel to which the channel measurement result corresponding to the channel identifier belongs, where each channel measurement result includes at least one of a signal-to-interference-plus-noise ratio, an RSSI, an optimal sector identifier, and channel measurement information, or the measurement results include a weighted signal-to-interference-plus-noise ratio and a maximum-probability optimal sector identifier, where the weighted signal-to-interference-plus-noise ratio is determined based on L signal-to-interference-plus-noise ratios of the L channels, and the maximum-probability optimal sector identifier is determined based on L optimal sector identifiers of the L channels.

DESCRIPTION OF EMBODIMENTS

The embodiments of this application may be applied to a WLAN, and may be applied to any one of IEEE 802.11 series protocols currently used by the WLAN. The WLAN may include one or more basic service sets (BSSs), and network nodes in the BSS include an access point (AP) and a Station (STA). Based on the original BSS, a personal BSS (PBSS) and a PBSS control point (PCP) are introduced into IEEE 802.11ad. Each personal BSS may include one AP/PCP and a plurality of non-PCP STAs associated with the AP/PCP. In the embodiments of this application, the non-PCP STA is referred to as a STA.

The AP is also referred to as an AP, a hotspot, or the like. The AP is an AP using which a mobile subscriber accesses a wired network, and is mainly deployed in home, inside a building, or in a campus with a typical coverage radius of tens to hundreds of meters, and certainly may also be deployed outdoors. The AP is equivalent to a bridge connecting a wired network and a wireless network. A main function of the AP is to connect wireless network clients, and then connect the wireless network to an Ethernet network. Further, the AP may be a terminal device or a network device having a WI-FI chip. Optionally, the AP/PCP may support the IEEE 802.11ay protocol. Further optionally, the AP/PCP may be a device that supports any one or more of IEEE 802.11 series protocols such as IEEE 802.11ad.

The STA may be a terminal device having a WI-FI chip, for example, a mobile phone that supports a WI-FI communication function, a tablet computer that supports a WI-FI communication function, a set-top box that supports a WI-FI communication function, a smart television (TV) that supports a WI-FI communication function, an intelligent wearable device that supports a WI-FI communication function, a vehicular communications device that supports a WI-FI communication function, and a computer that supports a WI-FI communication function. Optionally, the STA may support the IEEE 802.11ay protocol. Further optionally, the STA may support any one or more of IEEE 802.11 series protocols such as IEEE 802.11ad. The STA supporting IEEE 802.11ad may also be referred to as a Directional multi-gigabit (DMG) STA, and the STA supporting IEEE 802.11ay may be referred to as an Enhanced DMG (EDMG) STA. The DMG STA and the EDMG STA are referred to as a STA in the embodiments of this application.

In the embodiments of this application, a first device may be a STA, or may be an AP/PCP. Correspondingly, a second device may be a STA, or may be an AP/PCP.

Figure 1:
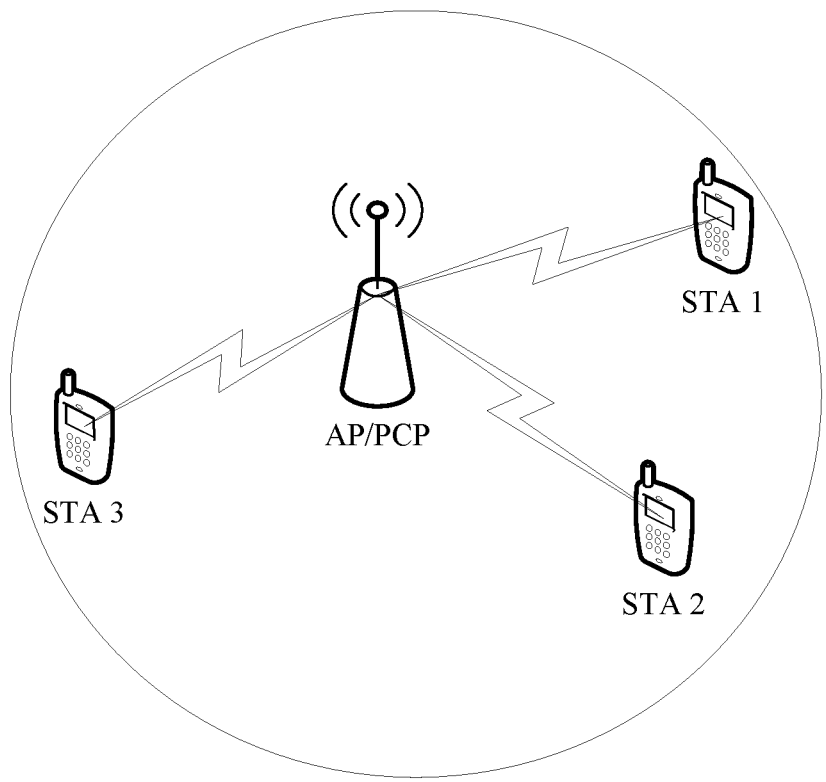
FIG. 1 is a schematic system diagram of a typical WLAN deployment scenario.

FIG. 1 is a schematic system diagram of a typical WLAN deployment scenario. FIG. 1 includes one AP/PCP and three STAs. The AP/PCP separately communicates with a STA 1, a STA 2, and a STA 3 to form a PBSS.

Figure 2:
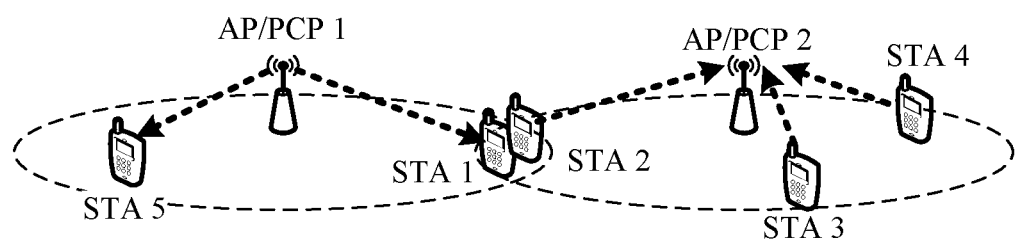
FIG. 2 is a schematic system diagram of another typical WLAN deployment scenario.

A plurality of PBSSs may coexist in the WLAN deployment scenario. FIG. 2 is a schematic system diagram of another typical WLAN deployment scenario. In the scenario shown in FIG. 2, an AP/PCP 1, a STA 1, and a STA 5 are located in a same BSS, and an AP/PCP 2, a STA 2, a STA 3, and a STA 4 are located in another PBSS.

Figure 3:
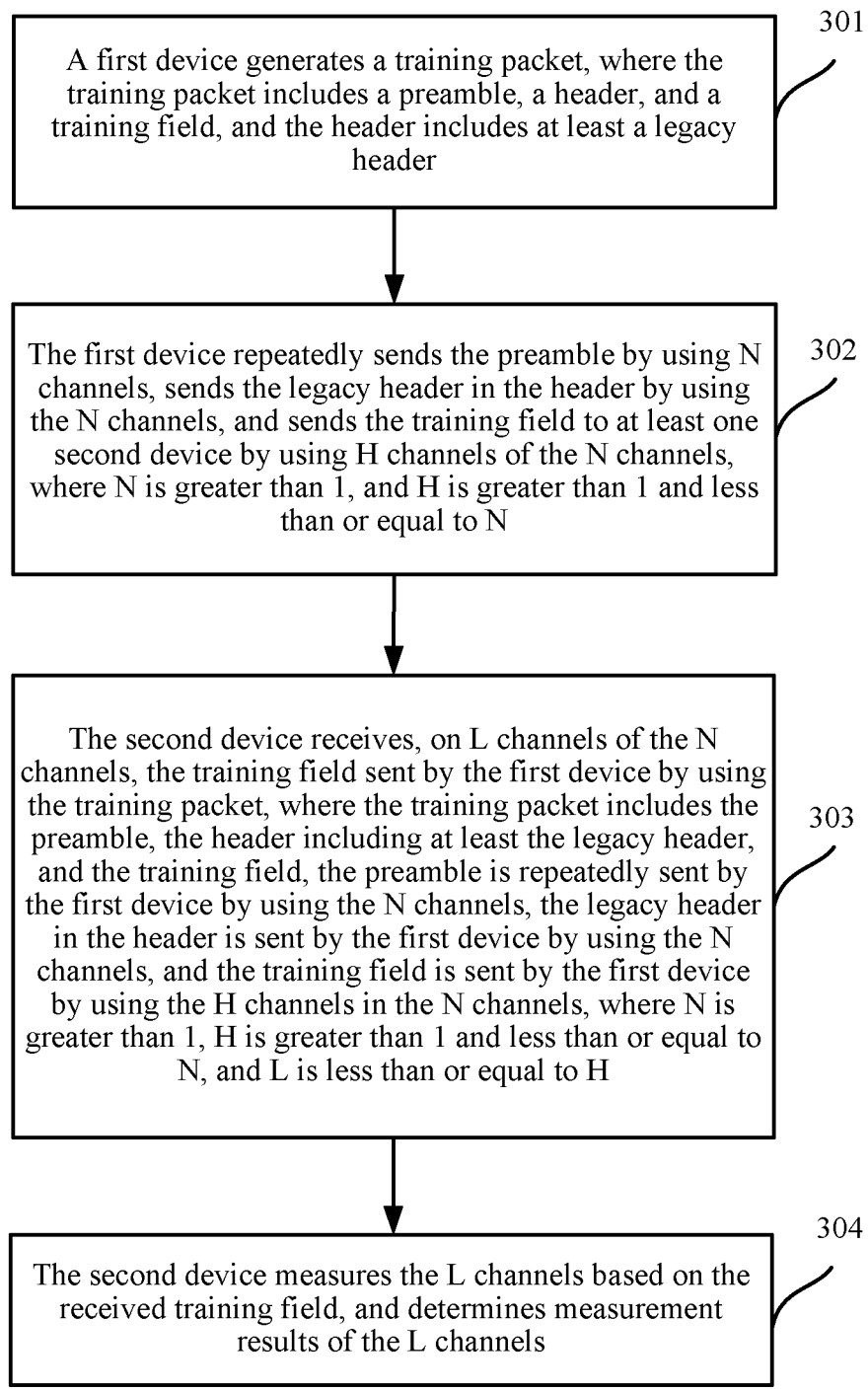
FIG. 3 is a schematic flowchart of a training packet sending method according to an embodiment of this application.

Based on the foregoing description, FIG. 3 is a schematic flowchart of a training packet sending method according to an embodiment of this application.

Step 301: A first device generates a training packet, where the training packet includes a preamble, a header, and a training field, and the header includes at least a legacy header.

In this embodiment of this application, the training packet generated by the first device is a data packet used for beam training. In a possible implementation, the training packet is a BRP packet defined in IEEE 802.11ad, and includes a preamble, a legacy header (also referred to as L-Header), a data field, and a training field. The legacy header herein is a DMG header, namely, a DMG header in IEEE 802.11ad, and is also referred to as a non-enhanced DMG (Non-EDMG) header as customary. The training packet may alternatively be an enhanced BRP (eBRP) packet that is newly defined in IEEE 802.11ay, for example, including some new fields or lacking a data field. This may be determined based on an actual case, and is not limited herein.

In this embodiment of this application, the header is also referred to as a physical header (PHY header), which is used to indicate a field of a transport format of a physical layer packet, and used to indicate a format of the data field and/or a format of the training field. The header may include at least one of a legacy header, a new header, and the like.

Step 302: The first device repeatedly sends the preamble using N channels, sends the legacy header in the header using the N channels, and sends the training field to at least one second device using H channels of the N channels, where N is greater than 1, and H is greater than 1 and less than or equal to N.

Step 303: The second device receives, on L channels of the N channels, the training field sent by the first device using the training packet, where the training packet includes the preamble, the header including at least the legacy header, and the training field, the preamble is repeatedly sent by the first device using the N channels, the legacy header in the header is sent by the first device using the N channels, and the training field is sent by the first device using the H channels of the N channels, where N is greater than 1, H is greater than 1 and less than or equal to N, and L is less than or equal to H.

Step 304: The second device measures the L channels based on the received training field, and determines measurement results of the L channels.

In step 301, the preamble in the training packet generated by the first device includes a short training field (STF) and a channel estimation field (CEF). The first device generates the preamble in a manner specified in the IEEE 802.11ad protocol. It should be noted that the STF is also referred to as a legacy STF, which is also referred to as an L-STF, and the CEF is also referred to as a legacy CEF, which is also referred to as an L-CEF. Because the STF and the CEF are also used in the IEEE 802.11ad protocol for transfer mode identification, there are a control mode and a non-control mode for the STF. The non-control mode includes a single-carrier (SC) mode and an Orthogonal Frequency Division Multiplexing (OFDM) mode, which include Gb128 and Ga128, respectively. An STF in the control mode includes 48 positive Gb128s, one negative Gb128, and one negative Ga128, namely, $$\underline{G_{b128} \cdots G_{b128}\ G_{b128}}_{48} - G_{b128} - G_{a128}.$$

An STF in the non-control mode includes 16 positive Ga128s and one negative Ga128, namely, $$\underline{G_{a128} \cdots G_{a128}\ G_{a128}}_{16} - G_{a128}.$$

CEFs in the SC mode and the OFDM mode also have different formats. The CEF in the SC mode is [Gu512, Gv512, Gv128], and the CEF in the OFDM mode is [Gv512, Gu512, Gv128].

Gu512=[−Gb128, −Ga128, Gb128, −Ga128], Gv512=[−Gb128, Ga128, −Gb128, −Ga128], and Gv128=[−Gb128]. Ga and Gb represent a pair of complementary Golay codes, and G128 represents a Golay sequence having a length of 128 code elements.

The header of the training packet generated by the first device includes at least the legacy header. Because a header (that is, a legacy header) in IEEE 802.11ad has three different forms, a control mode, an SC mode, and an OFDM mode, a legacy header in an IEEE 802.11ay packet may be sent in the three forms, or may be sent in two of the forms, for example, in only the control mode and the SC mode.

The header in the training packet generated by the first device may further include a new header that is located after the legacy header. Specific content of the new header is in an IEEE 802.11ay format, and supports a transfer mode that is not supported by the legacy header. The new header is a newly added EDMG header in IEEE 802.11ay. Certainly, the EDMG header herein may also be divided into a plurality of segments, for example, an EDMG header-A and an EDMG header-B. This is not limited herein.

If the header in the training packet generated by the first device further includes the new header, in step 302, the first device may send the new header in the header using the N channels.

The training packet generated by the first device may further include a new STF and a new CEF that are after the header. Specific content of the new-STF and the new-CEF is in an IEEE 802.11ay format. The new-STF and the new-CEF may occur when the L-STF and the L-CEF that are in the preamble cannot provide an accurate automatic gain control (AGC) gain and channel estimation for the data field, for example, when the data field is transmitted in a MIMO and/or CB manner.

The training packet generated by the first device may further include the data field, and the data field is located after the header and before the training field. The first device may send the data field using J channels of the N channels and M wideband channels. An $i^{th}$ wideband channel of the M wideband channels includes $K_i$ adjacent channels in the N channels and guard bandwidth between the $K_i$ adjacent channels, M is greater than or equal to 0, $$P = \sum_{i=1}^{M} K_i,$$

J+P=N, and J is greater than or equal to 0. Correspondingly, the first device may send the new STF and the new CEF using the J channels of the N channels and the M wideband channels.

It should be noted that channels included in any two wideband channels are not necessarily the same. To be specific, the $i^{th}$ wideband channel of the M wideband channels includes the $K_i$ adjacent channels in the N channels and the guard bandwidth between the $K_i$ adjacent channels, where i={1, . . . , M}.

The data field in the training packet generated by the first device may be generated in a manner stipulated in IEEE 802.11ad. For example, a data rate is adjusted using different modulation and coding schemes (MCS), and a variable range of the MCS in IEEE 802.11ad is from MCS 0 to MCS 24. Alternatively, the data field may be generated in an MCS manner newly stipulated in IEEE 802.11ay. In addition to modulation and coding, there may be other processing, for example, scrambling, spreading, and interleaving. This is not limited herein.

It should be noted that, if the data field in the training packet generated by the first device is separately sent on the N channels, that is, J is equal to N and M is equal to 0, the training packet generated by the first device does not include the new STF or the new CEF. It should be noted that, because the training field is generated based on bandwidth of a single channel, in a possible embodiment, a sampling point interval of the training field is Tc=0.57 nanoseconds (ns), which is the same as single carrier chip time in IEEE 802.11ad, or a sampling point interval of the training field is Ts=0.38 ns, which is the same as OFDM mode sampling time in IEEE 802.11ad.

The training field generated by the first device may be in a training field format in IEEE 802.11ad, and may include an AGC field and a training sequence (TRN) field. The AGC field may be used for AGC gain estimation, and the TRN field may be used for beam training. Likewise, the training field generated by the first device may alternatively be in a format of a training field newly defined in the IEEE 802.11ay protocol. Any format can be supported by this embodiment of this application provided that a length of a core Golay sequence is not changed. That is, the training field generated by the first device still includes only the following several Golay sequences, Ga64, Gb64, Ga128, and Gb128, and a specific format of the training field is not limited herein.

For example, the AGC in IEEE 802.11ad includes Ga64 or Gb64, and the TRN includes a plurality of TRN units. Each TRN unit includes one CEF and four receiver/transmitter training (TRN-T/R), and includes a plurality of Ga128 and Gb128. The CEF is in a same format as the CEF in the preamble, and a sampling point interval is Tc=0.57 ns. A new training field format may be defined in IEEE 802.11ay to further improve beam training efficiency.

An advantage of designing the training field using this method is that receiver complexity can be reduced. Because formats of training fields on a plurality of channels do not vary with a channel quantity, regardless of the channel quantity, the formats of the training fields on the channels are each provided in a form of a single channel, and only training field lengths may be different. No new Golay sequence is introduced, and no correlator based on the new Golay sequence needs to be newly designed. Therefore, when the plurality of channels are bonded, no correlator based on the new Golay sequence needs to be introduced during beaming training. Only beam training apparatuses on a plurality of single channels are required to support beam training on a plurality of channels. There is no need to design, based on the channel quantity, a plurality of correlators based on Golay sequences of different lengths, for example, G256, G512, and G1024.

In this embodiment of this application, the channel may be a channel that is stipulated in IEEE 802.11 series protocols. For example, channel division in IEEE 802.11ad is used as an example, and a channel on a 60 GHz frequency band is divided into four channels: 57.24 to 59.4 GHz, 59.4 to 61.56 GHz, 61.56 to 63.72 GHz, and 63.72 to 65.88 GHz. During single channel transmission, bandwidth occupied by the first device for sending is less than channel bandwidth, and unoccupied bandwidth on both sides of the channel bandwidth is guard bandwidth. An SC mode is used as an example. Bandwidth occupied in a channel by the first device for sending is 1.760 GHz, and there is guard bandwidth of (2.16−1.76)/2=0.2 GHz on each side of the channel. If two adjacent channels are bonded, an intermediate 400 megahertz (MHz) guard band may be used for transmission. In this case, bandwidth of a wideband channel obtained after the two channels are bonded is 1.760+0.4+1.76=3.92 GHz. Certainly, there may be more than four channels. With opening of a 60 GHz frequency band, more channels may be used for transmission, and this is not limited in this embodiment of this application.

In IEEE 802.11ay, a throughput may be improved using the following two transmission bandwidth increasing methods One method is to directly extend a single channel into a plurality of parallel channels, for example, a channel aggregation (CA) technology, and the other method is that a guard band between adjacent channels is used in addition to extending a single channel into a plurality of parallel channels, for example, a CB technology.

Figure 4A:
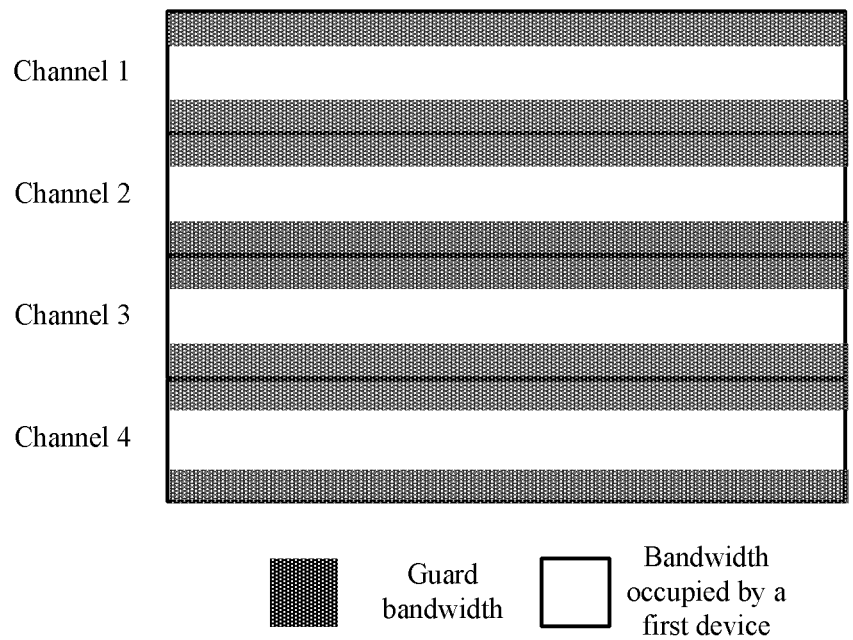
FIG. 4A, FIG. 4B, and FIG. 4C are schematic diagrams of a channel according to an embodiment of this application.

For example, FIG. 4A is a schematic diagram of multi-channel transmission according to an embodiment of this application. FIG. 4A includes four adjacent channels a channel 1 to a channel 4. A first device may use each of the four channels as a separate channel, and perform transmission simultaneously on each channel. A channel in IEEE 802.11ad is used as an example. The first device occupies only a part of bandwidth (for example, 1.760 GHz) of each channel for sending, that is, transmission bandwidth is extended using a CA technology.

Figure 4B:
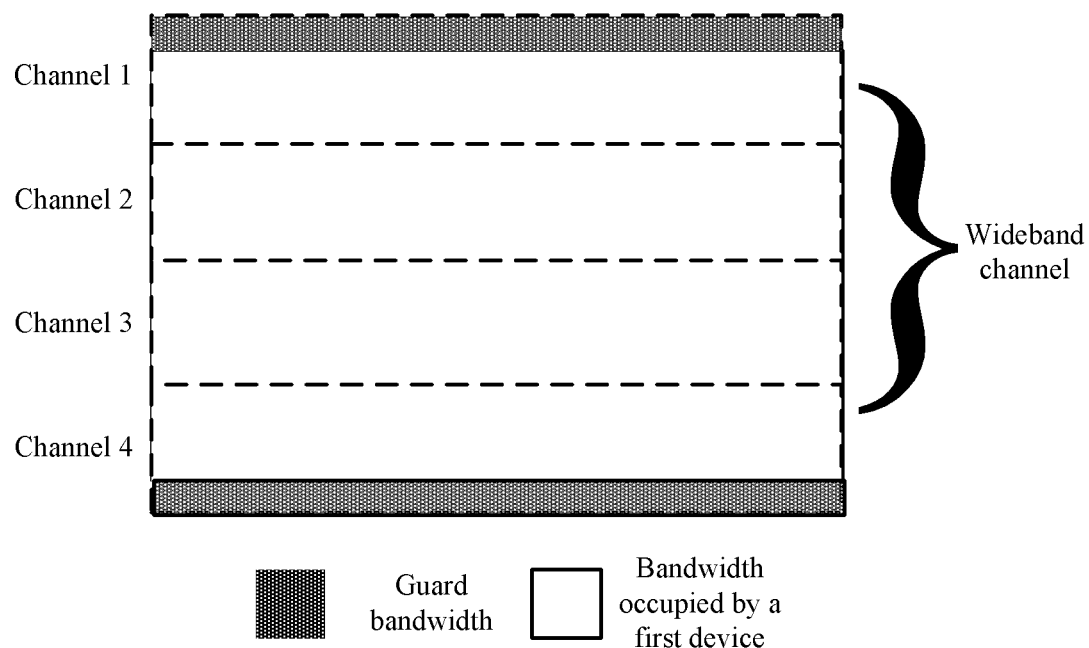
Figure 4C:
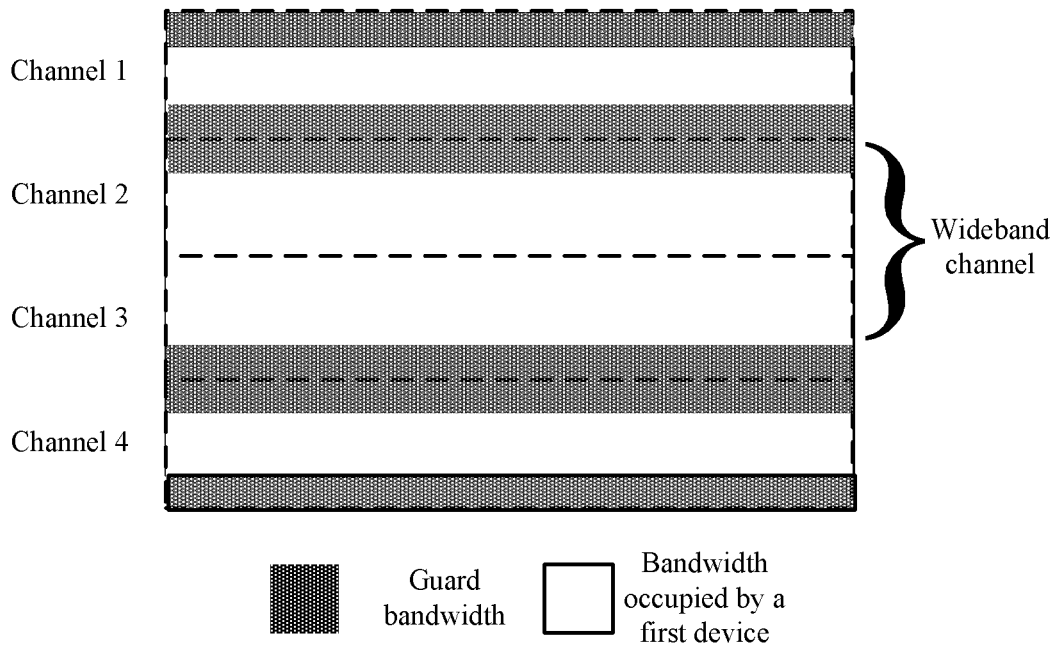

For example, FIG. 4B is a schematic diagram of another multi-channel transmission according to an embodiment of this application. FIG. 4B includes four adjacent channels a channel 1 to a channel 4. The first device may also send data on one wideband channel formed after the four channels are bonded. Further, with reference to FIG. 4B, a channel used by the first device for sending is a wideband channel including the four channels and guard bandwidth between the four channels, that is, transmission bandwidth is extended using a CB technology. The first device may alternatively perform transmission on two separate channels (the channel 1 and the channel 4) in the four channels and one bonded wideband channel (the channel 2 and the channel 3 are bonded). Further, with reference to FIG. 4A, FIG. 4C is a schematic diagram of a channel according to an embodiment of this application. In FIG. 4C, channels used by the first device are the channel 1, the channel 4, and a wideband channel (including the channel 2, the channel 3, and guard bandwidth between the channel 2 and the channel 3).

In this embodiment of this application, regardless of whether the first device sends the data field using the guard bandwidth between at least two adjacent channels in the N channels, the first device sends the training field to the at least one second device using at least one of the N channels.

For example, the first device may send the training field only on one of the N channels. The first device may alternatively send the training field on each of the N channels.

In this embodiment of this application, before sending the training field, the first device may notify the second device of information such as a length of the training field and an occupied channel.

In a possible implementation, the first device indicates the length of the training field by reinterpreting some fields in the legacy header. The legacy header includes a training length field, and the first device may reinterpret the training length field as a length of a training field that is sent on a same channel as the legacy header. That is, it implicitly indicates whether there is a training field on the channel. If a field length is non-zero, it indicates that a training field is sent on the channel, otherwise, it indicates that no training field is sent on the channel.

For example, if the training field generated by the first device is in the training field format in IEEE 802.11ad, the training field includes the AGC field and the TRN field. The AGC field may be used for AGC gain estimation, and the TRN field may be used for beam training. When the training length field in the legacy header is W, it indicates that there are 4×W sub-fields in an AGC field that is sent on a same channel as the legacy header, and that there are W TRN units in a TRN field that is sent on a same channel as the legacy header.

The legacy header further includes a packet type field, which is used to indicate a type of the TRN field. If the packet type field is 0×1, it is reinterpreted that a type of the TRN field that is sent on the same channel as the legacy header is a transmit training (TRN-T) field. If the packet type field is 0×0, it is reinterpreted that a type of the TRN field that is sent on the same channel as the legacy header is a receive training (TRN-R). Likewise, the training field generated by the first device may be in a format of a training field newly defined in the IEEE 802.11ay protocol. Any format can be supported by this embodiment of this application provided that a length of a core Golay sequence is not changed. That is, the new training field format still includes only Golay sequences Ga64, Gb64, Ga128, and Gb128, and a format of a specific sub-field is not limited herein.

It should be noted that the legacy header sent in this manner is not necessarily repeatedly sent, because each channel may independently indicate the length of the training field that is sent on the same channel as the legacy header. Therefore, a training length field in the legacy header sent by the first device on each channel may have a different value. When all fields in the legacy header on all the N channels are the same (including that the training length field and the packet type field are the same), the legacy header is repeatedly sent. In another possible implementation, the first device may carry, using the header, information about a channel occupied by the data field and information about a channel occupied by the training field. The header may include data field channel indication information and training field channel indication information, the data field channel indication information is used to indicate the channel occupied by the data field, and the training field channel indication information is used to indicate the channel occupied by the training field. In a possible implementation, the data field channel indication information and the training field channel indication information may be carried in the new header in the header. In a possible implementation, the data field channel indication information and the training field channel indication information may be carried in the legacy header in the header. In a possible implementation, the data field channel indication information may be carried in the new header in the header, and the training field channel indication information is carried in the legacy header in the header.

There may be a plurality of implementations for the data field channel indication information and the training field channel indication information. In a possible embodiment, the data field channel indication information may be a bitmap, and one bit in the bitmap uniquely corresponds to one of the N channels. When a value of a bit in the bitmap is a preset value, the bit indicates that the data field occupies a channel of the N channels that corresponds to the bit, and if the value of the bit is not the preset value, it indicates that the data field does not occupy the channel of the N channels that corresponds to the bit. Correspondingly, the training field channel indication information may be a bitmap, and one bit in the bitmap uniquely corresponds to one of the N channels. When a value of a bit in the bitmap is a preset value, the bit indicates that the training field occupies a channel of the N channels that corresponds to the bit, and if the value of the bit is not the preset value, it indicates that the training field does not occupy the channel of the N channels that corresponds to the bit. When the training field channel indication information indicates that the channel is not occupied, training field length information in the legacy header is invalid. That is, the training field length information in the legacy header is valid only when channel information indicates that the channel is occupied.

For example, the preset value is 1. In this case, when a value of a bit that is in the bitmap and that corresponds to the training field channel indication information is 1, it indicates that the training field occupies a channel corresponding to the bit, and when a value of a bit in the bitmap is 0, it indicates that the training field does not occupy a channel corresponding to the bit. Certainly, the foregoing is merely an example, and the preset value may alternatively be 0.

It should be noted that the correspondence between each bit in the bitmap and each of the N channels may be agreed on between the first device and the second device in advance, or may be determined in another manner, and details are not described herein.

In a possible embodiment, the data field channel indication information may be a bitmap. The training field channel indication information may be 1-bit information, which indicates a relationship between the channel occupied by the training field and the channel occupied by the data field, and implicitly indicates the channel occupied by the training field. One possible relationship is that 1 indicates that the training field is repeatedly sent on the N channels on which the data field is sent, or 0 indicates that the training field is sent only on a primary channel.

The first device may alternatively send the training field to the at least one second device using preset H channels in the N channels. In this manner, the first device and the at least one second device need to agree on, in advance, a channel used to send the training field. In this case, before or after sending the training field, the first device does not need to notify the at least one second device of locations, on the N channels, of the H channels occupied for sending the training field. Optionally, in this embodiment of this application, the preset H channels are primary channels. That is, the first device sends the training field using primary channels in the N channels, and the primary channel is a channel on which a beacon is sent.

In another embodiment of this application, the preset H channels are the N channels used for sending the preamble. To be specific, the training field is repeatedly sent in a CA manner on all channels used for sending the preamble. Because the training field is sent on all the N channels and lengths of training fields are the same, training field length information carried in the legacy header is the same. The first device repeatedly sends the legacy header in the header using the N channels. The first device repeatedly sends the training field using the N channels. In this embodiment of this application, the first device may send the training field in a plurality of manners using the N channels, and detailed descriptions are provided below using embodiments.

When the first device uses a single antenna, the first device may alternatively send the training field on each of the N channels repeatedly, and in this case, H is equal to N.

When the first device uses a plurality of antennas, the first device may alternatively send the training field on each of the N channels using different antennas. It should be noted that, in this case, information about a transmit antenna on each channel may be carried by a physical layer header, or may be carried by a field at a Media Access Control (MAC) layer, and details are not described herein.

In this embodiment of this application, data field sending bandwidth and training field sending bandwidth are decoupled. Regardless of whether data is sent using a CA technology or a CB technology, the training field is sent using the CA technology. Complexity of measuring a device using the training field can be reduced. Each second device needs only one radio frequency channel of single channel bandwidth to implement beam training on a single channel. In addition, configurations of each channel for sending the training field may be different. For example, training field lengths may be different, and antennas for sending the training field may be different, thereby improving training field sending flexibility and beam training flexibility.

Before sending the training packet to the at least one second device, the first device may determine, using different methods, a channel used for sending the training field to flexibly configure beam training and measurement.

In a first possible implementation, when starting a BRP phase for the first time after an SLS phase, the first device determines that the channel used for sending the training field includes all the N channels. In another implementation, during beam tracking, the first device determines that the channel used for sending the training field is a primary channel in the N channels, namely, a channel on which a beacon is sent.

In a second possible implementation, during beam tracking, the first device determines the channel used for sending the training field is any one of the N channels.

In a third possible implementation, when a quantity of communications antennas between the first device and the second device increases, the first device determines that the channel used for sending the training field that includes a beam training field of a newly added antenna is any one of the N channels.

In a fourth possible implementation, when a quantity of communications channels between the first device and the second device increases, it is determined that the channel used for sending the training field is a newly added channel in the N channels.

In a fifth possible implementation, the first device determines, based on channel information fed back by the second device, the channel used for sending the training field. The second device determines a receiving parameter of each channel based on a reference signal (including a CEF in the preamble, a guard interval field in the SC mode in the data, or a pilot in the OFDM mode) received on each channel, such as a signal-to-noise ratio (SNR), an RSSI, signal quality (SQ), or a received channel power indicator (RCPI), and feeds back the receiving parameter to the first device. The first device uses at least one channel with highest channel quality in the N channels as the channel used for sending the training field. Optionally, the first device determines the channel for the training field based on a BRP measurement request sent by the second device. The BRP measurement request sent by the second device to the first device includes channel identifiers, and the channel identifiers are identifiers of H channels in channels on which the first device performs sending, or the BRP measurement request sent by the second device to the first device includes a channel identifier and an antenna identifier (which may also be considered as an identifier of a radio frequency chain). Because a hybrid beam (hybrid of a digital beam and an analog beam) forming technology may be used on a high frequency band, a plurality of antenna array elements share one radio frequency chain. In a digital domain, the antenna identifier and a radio frequency chain identifier are in a one-to-one correspondence. An antenna array element identifier in an analog domain is not visible in the digital domain, and is embodied using different antenna weighted vectors (AWVs).

Figure 5:
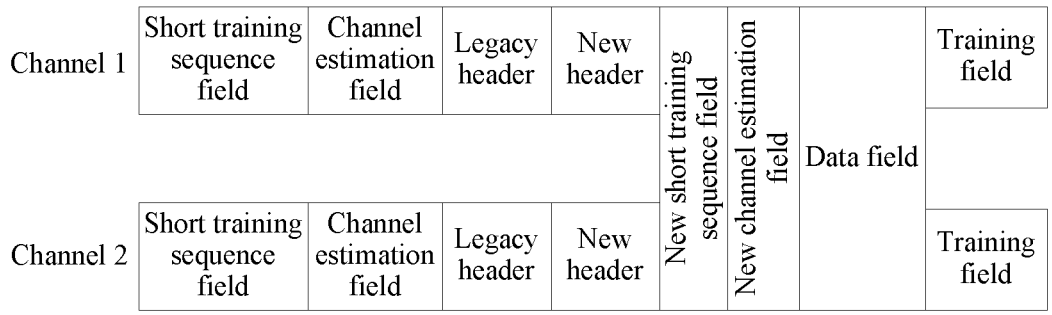
FIG. 5 is a schematic diagram of training packet sending according to an embodiment of this application.

With reference to the foregoing description, in this embodiment of this application, N=2, M=1, $K_1$=2, P=2, J=0, and H=2 are used as an example. FIG. 5 is a schematic diagram of training packet sending according to an embodiment of this application. In FIG. 5, a first device bonds two channels, a channel 1 and a channel 2. The channel 1 and the channel 2 are adjacent channels. A training packet generated by the first device includes a preamble, a header, and a training field. The preamble includes an STF and a CEF, and the header includes a legacy header. The first device repeatedly sends the preamble using the channel 1 and the channel 2, sends the header using the channel 1 and the channel 2, and repeatedly sends the training field using the channel 1 and the channel 2. Because the training field is sent on both channels and lengths of training fields are the same, training field length information carried in the legacy header is the same. The first device repeatedly sends the legacy header in the header using the channel 1 and the channel 2.

Optionally, the training packet generated by the first device further includes a new header, a new STF, a new CEF, and a data field. The first device sends the new header using the channel 1 and the channel 2, and sends the new STF, the new CEF, and the data field using a wideband channel including the channel 1, the channel 2, and guard bandwidth between the channel 1 and the channel 2.

Figure 6:
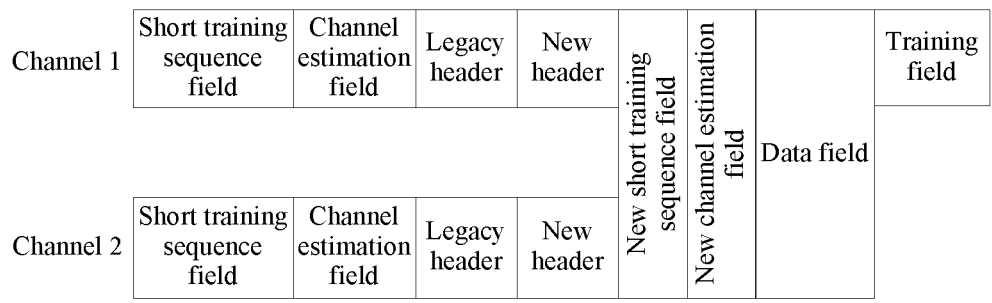
FIG. 6 is a schematic diagram of training packet sending according to an embodiment of this application.

In this embodiment of this application, N=2, M=1, $K_1$=2, P=2, J=0, and H=1 are used as an example. FIG. 6 is a schematic diagram of training packet sending according to an embodiment of this application. In FIG. 6, a first device bonds two channels a channel 1 and a channel 2. The channel 1 and the channel 2 are adjacent channels. A training packet generated by the first device includes a preamble, a header, and a training field. The preamble includes an STF and a CEF, and the header includes a legacy header. The first device repeatedly sends the preamble using the channel 1 and the channel 2, and sends the header using the channel 1 and the channel 2. The first device sends the training field using the channel 1.

Optionally, the training packet generated by the first device further includes a new header, a new STF, a new CEF, and a data field. The first device sends the new header using the channel 1 and the channel 2, and sends the new STF, the new CEF, and the data field using a wideband channel including the channel 1, the channel 2, and guard bandwidth between the channel 1 and the channel 2.

It should be noted that, in this case, a value of a training length field in the legacy header sent by the first device on the channel 2 may be 0.

Figure 7:
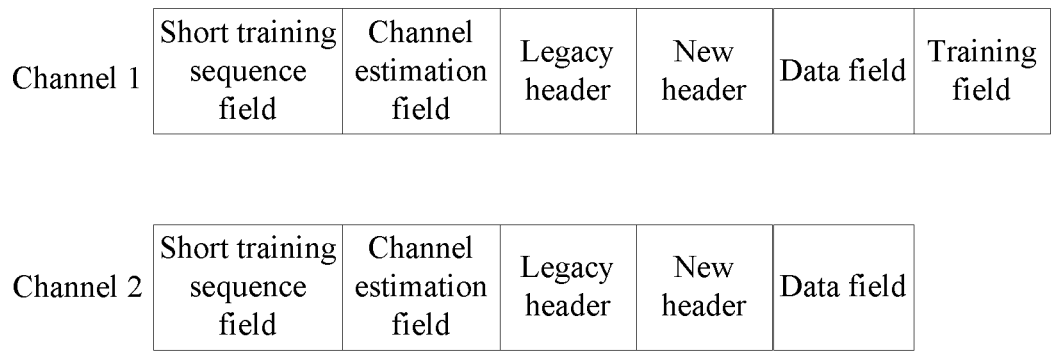
FIG. 7 is a schematic diagram of training packet sending according to an embodiment of this application.

In this embodiment of this application, N=2, M=0, $K_1$=0, P=0, J=2, and H=1 are used as an example. FIG. 7 is a schematic diagram of training packet sending according to an embodiment of this application. In FIG. 7, a first device bonds two channels a channel 1 and a channel 2. The channel 1 and the channel 2 are adjacent channels. A training packet generated by the first device includes a preamble, a header, a data field, and a training field. The preamble includes an STF and a CEF, and the header includes a legacy header and a new header. The first device repeatedly sends the preamble using the channel 1 and the channel 2, and sends the header using the channel 1 and the channel 2. The first device repeatedly sends the STF and the CEF that are in the preamble using the channel 1 and the channel 2, and sends the legacy header and the new header that are in the header using the channel 1 and the channel 2. The first device sends the data field using the channel 1 and the channel 2. The first device sends the training field using the channel 1.

It should be noted that in this embodiment of this application, the training field sent by the first device using H channels may be received by at least one second device, and each second device may receive a training field on at least one channel. When at least two second devices receive the training field, each second device may be instructed to receive the training field on a specified channel. The first device may instruct, using signaling, each second device to receive the training field on the specified channel.

For example, the first device sends the training field using three channels, a channel 1 to a channel 3. In this case, the first device instructs, using signaling, a 1st second device to separately receive the training field on the channel 1 and the channel 2, and the first device instructs, using signaling, a 2nd second device to receive the training field on the channel 3.

In step 303, the second device may listen on the N channels in order to receive, on the L channels of the N channels, the training field sent by the first device using the training packet.

Before receiving the training field, the second device may further receive, on the N channels, the preamble and the header that are sent by the first device. Optionally, the second device may further receive the data field sent by the first device. Certainly, the second device may not receive the data field, and this is determined based on an actual case, and is not limited herein.

After receiving the preamble sent by the first device using the training packet, the second device may obtain information such as packet synchronization and AGC gain adjustment based on an L-STF in the preamble received on each channel. The second device may further perform channel estimation on each channel based on a CEF in the preamble received on each channel. Optionally, the second device may perform, based on channel estimation on each channel, operations such as demodulation on a header (including a legacy header and/or a new header) received on the corresponding channel to obtain a data field length and training field information such as a channel, a length, and a start point (an end point of the data field) of training field transmission.

The information such as the training field length and an occupied channel may be carried in the header (including the legacy header and/or the new header), or may be implemented using predetermined channel information. For details, refer to the foregoing description, and details are not described herein again.

In step 304, the second device may perform channel measurement on the L channels occupied by the received training field, to obtain channel measurement results of the L channels occupied by the training field.

In this embodiment of this application, a channel measurement result of each channel may include at least one of a signal-to-interference-plus-noise ratio (also referred to as SINR), an RSSI, an optimal sector identifier, and channel measurement information (Measurement of channel).

Optionally, the second device receives a measurement result reporting request sent by the first device, and the measurement result reporting request is used to instruct the second device to send the measurement results of the L channels to the first device.

After receiving the measurement result reporting request, the second device sends the measurement results of the L channels to the first device.

The measurement results of the L channels sent by the second device may include a mode identifier, and the mode identifier is used to indicate that a mode used for reporting the channel measurement results is a narrowband reporting mode or a wideband reporting mode.

It should be noted that, in this embodiment of this application, the narrowband reporting mode means that the channel measurement results of all the L channels are separately reported to the first device, and the wideband reporting mode means that the measurement results of the L channels are reported to the first device after operation.

If the mode identifier in the measurement results is used to indicate that the mode used for reporting the measurement result is the narrowband reporting mode, the measurement results include L channel measurement results and L channel identifiers, and one channel identifier uniquely corresponds to one channel measurement result and is used to indicate a channel to which a channel measurement result corresponding to the channel identifier belongs. In a multi-antenna scenario, the measurement results may further include an antenna identifier.

If the mode identifier in the measurement results is used to indicate that a mode for reporting the measurement result is the wideband reporting mode, the measurement results may include a weighted signal-to-interference-plus-noise ratio and a maximum-probability optimal sector identifier. The weighted signal-to-interference-plus-noise ratio is determined based on L signal-to-interference-plus-noise ratios of the L channels, and the maximum-probability optimal sector identifier is determined based on L optimal sector identifiers of the L channels.

In this embodiment of this application, the weighted signal-to-interference-plus-noise ratio may be determined in the following manner. An averaging operation is performed on the L signal-to-interference-plus-noise ratios of the L channels, to obtain the weighted signal-to-interference-plus-noise ratio.

In this embodiment of this application, the maximum-probability optimal sector identifier may be determined in the following manner A section identifier that is repeated for a maximum quantity of times in the L optimal sector identifiers of the L channels is used as the maximum-probability optimal sector identifier.

Based on a same concept, an embodiment of this application provides a training packet sending apparatus, which is configured to perform the foregoing method procedure.

Figure 8:
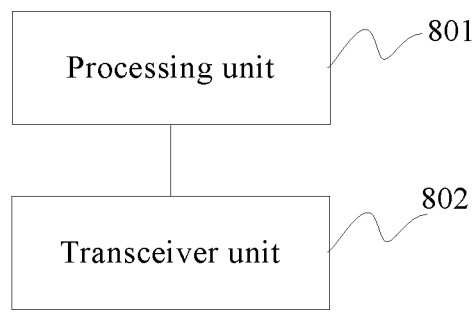
FIG. 8 is a schematic structural diagram of a training packet sending apparatus according to an embodiment of this application.

FIG. 8 is a schematic structural diagram of a training packet sending apparatus according to an embodiment of this application.

Referring to FIG. 8, the apparatus includes a processing unit 801 configured to generate a training packet, where the training packet includes a preamble, a header, and a training field, and the header includes at least a legacy header, and a transceiver unit 802 configured to repeatedly send the preamble using N channels, send the legacy header in the header using the N channels, and send the training field to at least one second device using H channels of the N channels, where N is greater than 1, and H is greater than 1 and less than or equal to N.

Optionally, the training packet further includes a data field, and the data field is located after the header and before the training field, and the transceiver unit 802 is configured to send the data field using J channels of the N channels and M wideband channels, where an $i^{th}$ wideband channel of the M wideband channels includes $K_i$ adjacent channels in the N channels and guard bandwidth between the $K_1$ adjacent channels, M is greater than or equal to 0, $$P = \sum_{i=1}^{M} K_i,$$

J+P=N, and J is greater than or equal to 0.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by the data field.

Optionally, the training field channel indication information is a bitmap, and one bit in the bitmap uniquely corresponds to one of the N channels, and when a value of a bit in the bitmap is a preset value, the bit indicates that the training field occupies a channel of the N channels that corresponds to the bit.

Optionally, the processing unit 801 is further configured to send the training field to the at least one second device using preset H channels in the N channels.

Optionally, the training field includes only the following Golay sequences, Ga64, Gb64, Ga128, and Gb128.

Based on a same concept, an embodiment of this application provides a training packet receiving apparatus, which is configured to perform the foregoing method procedure.

Figure 9:
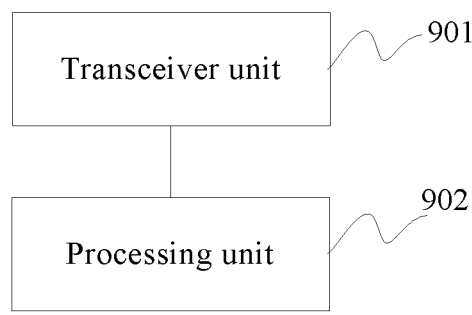
FIG. 9 is a schematic structural diagram of a training packet receiving apparatus according to an embodiment of this application.

FIG. 9 is a schematic structural diagram of a training packet receiving apparatus according to an embodiment of this application.

Referring to FIG. 9, the apparatus includes a transceiver unit 901 configured to receive, on L channels of N channels, a training field sent by a first device using a training packet, where the training packet includes a preamble, a header including at least a legacy header, and a training field, the preamble is repeatedly sent by the first device using the N channels, the legacy header in the header is sent by the first device using the N channels, and the training field is sent by the first device using H channels of the N channels, where N is greater than 1, H is greater than 1 and less than or equal to N, and L is less than or equal to H, and a processing unit 902 configured to measure the L channels based on the received training field, and determine measurement results of the L channels.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by the data field.

Optionally, the training field channel indication information is a bitmap, and one bit in the bitmap uniquely corresponds to one of the N channels, and when a value of a bit in the bitmap is a preset value, the bit indicates that the training field occupies a channel of the N channels that corresponds to the bit.

Optionally, after determining the measurement results of the L channels, the transceiver unit 901 is further configured to feedback the measurement results to the first device, where the measurement results include L channel measurement results and L channel identifiers, and one channel identifier uniquely corresponds to one channel measurement result and is used to indicate a channel to which the channel measurement result corresponding to the channel identifier belongs, where each channel measurement result includes at least one of a signal-to-interference-plus-noise ratio, an RSSI, an optimal sector identifier, and channel measurement information, or the measurement results include a weighted signal-to-interference-plus-noise ratio and a maximum-probability optimal sector identifier, where the weighted signal-to-interference-plus-noise ratio is determined based on L signal-to-interference-plus-noise ratios of the L channels, and the maximum-probability optimal sector identifier is determined based on L optimal sector identifiers of the L channels.

Based on a same concept, an embodiment of this application provides a training packet sending apparatus, which is configured to perform the foregoing method procedure.

Figure 10:
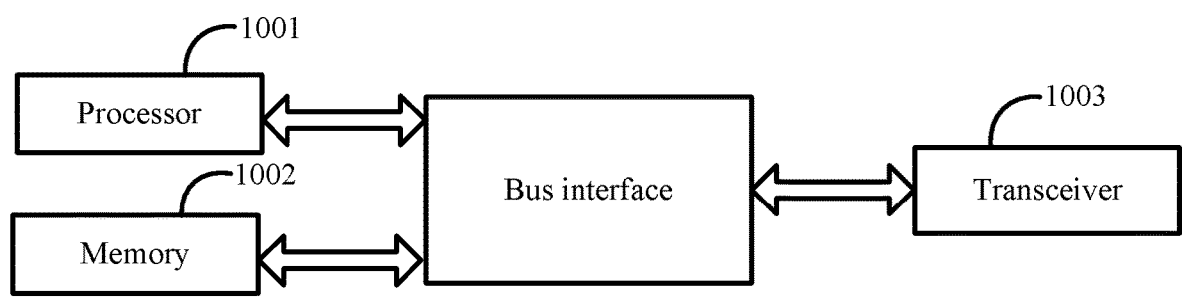
FIG. 10 is a schematic structural diagram of a training packet sending apparatus according to an embodiment of this application.

FIG. 10 is a schematic structural diagram of a training packet sending apparatus according to an embodiment of this application.

Referring to FIG. 10, the apparatus includes a processor 1001, a memory 1002, and a transceiver 1003.

The transceiver 1003 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a WLAN communications interface, a cellular network communications interface, or a combination thereof. The processor 1001 may be a central processing unit (CPU), a network processor (NP), or a combination of a CPU and an NP. The processor 1001 may further include a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. The memory 1002 may include a volatile memory, for example, a random access memory (RAM), or the memory 1002 may include a nonvolatile memory, for example, a read-only memory (ROM), a flash memory, a hard disk drive (HDD), or a solid-state drive (SSD), or the memory 1002 may include a combination of the foregoing types of memories.

The processor 1001 is configured to generate a training packet, where the training packet includes a preamble, a header, and a training field, and the header includes at least a legacy header.

The transceiver 1003 is configured to repeatedly send the preamble using N channels, send the legacy header in the header using the N channels, and send the training field to at least one second device using H channels of the N channels, where N is greater than 1, and H is greater than 1 and less than or equal to N.

Optionally, the training packet further includes a data field, and the data field is located after the header and before the training field, and the transceiver 1003 is further configured to send the data field using J channels of the N channels and M wideband channels, where an $i^{th}$ wideband channel of the M wideband channels includes $K_i$ adjacent channels in the N channels and guard bandwidth between the $K_i$ adjacent channels, M is greater than or equal to 0, $$P = \sum_{i=1}^{M} K_i,$$

J+P=N, and J is greater than or equal to 0.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by the data field.

Optionally, the training field channel indication information is a bitmap, and one bit in the bitmap uniquely corresponds to one of the N channels, and when a value of a bit in the bitmap is a preset value, the bit indicates that the training field occupies a channel of the N channels that corresponds to the bit.

Optionally, the processor 1001 is further configured to send the training field to the at least one second device using preset H channels in the N channels.

Optionally, the training field includes only the following Golay sequences Ga64, Gb64, Ga128, and Gb128.

A bus interface may further be included in FIG. 10, and the bus interface may include any quantity of interconnecting buses and bridges, which further connect various circuits of one or more processors represented by the processor and a memory represented by the memory. The bus interface may further connect various other circuits, such as a peripheral device, a voltage stabilizer, and a power management circuit. This is well known in the art, and therefore is not further described in this specification. The bus interface provides an interface. A transceiver provides a unit for communicating with various other devices on a transmission medium. The processor is responsible for bus architecture management and general processing. The memory may store data used when the processor executes an operation.

Based on a same concept, an embodiment of this application provides a training packet receiving apparatus, which is configured to perform the foregoing method procedure.

Figure 11:
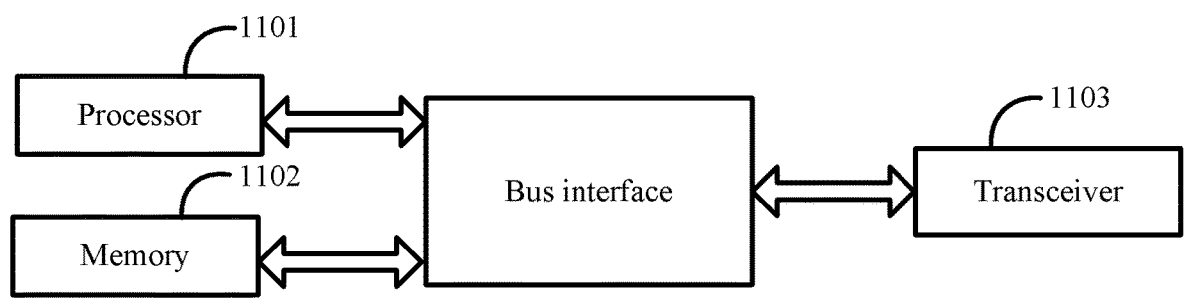
FIG. 11 is a schematic structural diagram of a training packet receiving apparatus according to an embodiment of this application.

FIG. 11 is a schematic structural diagram of a training packet receiving apparatus according to an embodiment of this application.

Referring to FIG. 11, the apparatus includes a processor 1101, a memory 1102, and a transceiver 1103.

The transceiver 1103 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a WLAN communications interface, a cellular network communications interface, or a combination thereof. The processor 1101 may be a CPU, an NP, or a combination of a CPU and an NP. The processor 1101 may further include a hardware chip. The hardware chip may be an ASIC, a PLD, or a combination thereof. The PLD may be a CPLD, an FPGA, GAL, or any combination thereof. The memory 1102 may include a volatile memory, for example, a RAM, or the memory 1102 may include a nonvolatile memory, for example, a ROM, a flash memory, an HDD, or an SSD, or the memory 1102 may include a combination of the foregoing types of memories.

The transceiver 1103 is configured to receive, on L channels of N channels, a training field sent by a first device using a training packet, where the training packet includes a preamble, a header including at least a legacy header, and a training field, the preamble is repeatedly sent by the first device using the N channels, the legacy header in the header is sent by the first device using the N channels, and the training field is sent by the first device using H channels of the N channels, where N is greater than 1, H is greater than 1 and less than or equal to N, and L is less than or equal to H.

The processor 1101 is configured to measure the L channels based on the received training field, and determine measurement results of the L channels.

Optionally, the legacy header includes a training length field used to indicate a length of a training field that is sent on a same channel as the legacy header.

Optionally, the header includes training field channel indication information, and the training field channel indication information is used to indicate a channel occupied by the training field.

Optionally, the header further includes data field channel indication information, and the data field channel indication information is used to indicate a channel occupied by the data field.

Optionally, the training field channel indication information is a bitmap, and one bit in the bitmap uniquely corresponds to one of the N channels, and when a value of a bit in the bitmap is a preset value, the bit indicates that the training field occupies a channel of the N channels that corresponds to the bit.

Optionally, after determining the measurement results of the L channels, the transceiver 1103 is further configured to feedback the measurement results to the first device, where the measurement results include L channel measurement results and L channel identifiers, and one channel identifier uniquely corresponds to one channel measurement result and is used to indicate a channel to which the channel measurement result corresponding to the channel identifier belongs, where each channel measurement result includes at least one of a signal-to-interference-plus-noise ratio, an RSSI, an optimal sector identifier, and channel measurement information, or the measurement results include a weighted signal-to-interference-plus-noise ratio and a maximum-probability optimal sector identifier, where the weighted signal-to-interference-plus-noise ratio is determined based on L signal-to-interference-plus-noise ratios of the L channels, and the maximum-probability optimal sector identifier is determined based on L optimal sector identifiers of the L channels.

A bus interface may further be included in FIG. 11, and the bus interface may include any quantity of interconnecting buses and bridges, which further connect various circuits of one or more processors represented by the processor and a memory represented by the memory. The bus interface may further connect various other circuits, such as a peripheral device, a voltage stabilizer, and a power management circuit. This is well known in the art, and therefore is not further described in this specification. The bus interface provides an interface. A transceiver provides a unit for communicating with various other devices on a transmission medium. The processor is responsible for bus architecture management and general processing. The memory may store data used when the processor executes an operation.

Persons skilled in the art should understand that the embodiments of this application may be provided as a method, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc ROM (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine such that the instructions executed by a computer or a processor of another programmable data processing device generate a device for implementing a specific function in one or more processes in the flowcharts and/or in one or more blocks in the block diagrams.

These computer program instructions may also be stored in a computer readable memory that can instruct the computer or another programmable data processing device to work in a specific manner such that the instructions stored in the computer readable memory generate an artifact that includes an instruction device. The instruction device implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provides steps for implementing a specific function in one or more processes in the flowcharts and/or in one or more blocks in the block diagrams.

Although some embodiments of this application have been described, persons skilled in the art can make changes and modifications to these embodiments once they learn the basic concept. Therefore, the following claims are intended to be construed as to cover the embodiments and all changes and modifications falling within the scope of this application.

Obviously, persons skilled in the art can make various modifications and variations to this application without departing from the scope of this application. This application is intended to cover these modifications and variations of this application provided that they fall within the scope of protection defined by the following claims and their equivalent technologies.

What is claimed is:

1. A data packet sending method in a first device, wherein the method comprises:
generating a training packet comprising a preamble, a header comprising a legacy header, a training field, and a data field located after the header and before the training field, wherein the header further comprises training field channel information indicating a channel occupied by the training field; and
repeatedly sending the preamble using N channels;
sending the legacy header using the N channels;
sending the training field to at least one second device using H channels of the N channels, wherein N is greater than one, and wherein H is greater than one and less than or equal to N; and
sending the data field using J channels of the N channels, wherein J is greater than or equal to zero.

2. The data packet sending method of claim 1, wherein the legacy header comprises a training length field indicating a length of a training field sent on a same channel as the legacy header.

3. The data packet sending method of claim 1, wherein the header training packet is a beam refinement protocol (BRP) packet used for beam training.

4. The data packet sending method of claim 1, wherein the training field channel indication information is a bitmap, wherein one bit in the bitmap uniquely corresponds to one of the N channels, and wherein when a value of the one bit is a preset value, the one bit indicates that the training field occupies the one of the N channels corresponding to the one bit.

5. The data packet sending method of claim 1, wherein H is equal to N.

6. A training packet receiving method in a second device, wherein the method comprises:
receiving, on L channels of N channels, a training field from a first device using a training packet comprising a preamble, a header comprising a legacy header, the training field, and a data field located after the header and before the training field, wherein the header further comprises training field channel information indicating a channel occupied by the training field;
receiving, repeatedly from the first device using the N channels, the preamble;
receiving, from the first device using the N channels, the legacy header;
receiving, from the first device using H channels of the N channels, the training field, wherein N is greater than one, wherein H is greater than one and less than or equal to N, and wherein L is less than or equal to H;
measuring the L channels based on the received training field;
determining measurement results of the L channels;
transmitting the measurement results to the first device; and
receiving the data field using J channels of the N channels, wherein J is greater than or equal to zero.

7. The training packet receiving method of claim 6, wherein the legacy header comprises a training length field indicating a length of a training field received on a same channel as the legacy header.

8. The training packet receiving method of claim 6, wherein the training field channel information is a bitmap.

9. The training packet receiving method of claim 8, wherein one bit in the bitmap uniquely corresponds to one of the N channels, and wherein when a value of the one bit is a preset value, the one bit indicates that the training field occupies the one of the N channels corresponding to the one bit.

10. A training packet sending apparatus comprising:
a processor configured to generate a training packet comprising a preamble, a header comprising a legacy header, a training field, and a data field located after the header and before the training field, wherein the header further comprises training field channel information indicating a channel occupied by the training field; and
a transceiver coupled to the processor and configured to:
repeatedly send the preamble using N channels;
send the legacy header using the N channels;
send the training field to at least one second device using H channels of the N channels, wherein N is greater than one, and wherein H is greater than one and less than or equal to N; and
send the data field using J channels of the N channels, wherein J is greater than or equal to zero.

11. The training packet sending apparatus of claim 10, wherein the legacy header comprises a training length field indicating a length of a training field sent on a same channel as the legacy header.

12. The training packet sending apparatus of claim 10, wherein the training field channel information is a bitmap.

13. The training packet sending apparatus of claim 12, wherein one bit in the bitmap uniquely corresponds to one of the N channels, and wherein when a value of the one bit is a preset value, the one bit indicates that the training field occupies the one of the N channels corresponding to the one bit.

14. The training packet sending apparatus of claim 10, wherein H is equal to N.

15. A data packet receiving apparatus comprising:
a transceiver configured to:
receive, on L channels of N channels, a training field from a first device using a training packet, wherein the training packet comprises a preamble, a header comprising a legacy header, the training field, and a data field located after the header and before the training field wherein the header further comprises training field channel information indicating a channel occupied by the training field;

receive, repeatedly from the first device using the N channels, the preamble;

receive, from the first device using the N channels, the header;

receive, from the first device using H channels of the N channels, the training field, wherein N is greater than one, wherein H is greater than one and less than or equal to N, and wherein L is less than or equal to the H; and a processor coupled to the transceiver and configured to:

measure the L channels based on the received training field; and determine measurement results of the L channels, and wherein the transceiver is further configured to:

transmit the measurement results of the L channels to the first device; and receive, from the first device, the data field using J channels of the N channels, wherein J is greater than or equal to zero.

16. The data packet receiving apparatus of claim 15, wherein the legacy header comprises a training length field indicating a length of a training field received on a same channel as the legacy header.

17. The data packet receiving apparatus of claim 15, wherein the training field channel information is a bitmap.

18. The data packet receiving apparatus of claim 17, wherein one bit in the bitmap uniquely corresponds to one of the N channels, and wherein when a value of the one bit is a preset value, the one bit indicates that the training field occupies the one of the N channels corresponding to the one bit.

19. The data packet receiving apparatus of claim 15, wherein the H channels used to receive the training field are primary channels that are preset in the N channels.

20. The data packet receiving apparatus of claim 15, wherein each of the H channels used to receive the training field is a primary channel on which a beacon is sent.

* * * * *

UNITED STATES PATENT AND TRADEMARK OFFICE
CERTIFICATE OF CORRECTION

PATENT NO. : 11,388,029 B2  
APPLICATION NO. : 16/897021  
DATED : July 12, 2022  
INVENTOR(S) : Liu et al.

Page 1 of 1

It is certified that error appears in the above-identified patent and that said Letters Patent is hereby corrected as shown below:

In the Claims

Claim 3, Column 23, Line 50: "header training packet" should read "training packet"

Signed and Sealed this  
Sixth Day of September, 2022

Katherine Kelly Vidal  
*Director of the United States Patent and Trademark Office*